United States Patent [19]

Hawk

[11] Patent Number: 5,299,379
[45] Date of Patent: Apr. 5, 1994

[54] QUICK RELEASE FISHING LURE CONNECTION APPARATUS AND METHOD

[76] Inventor: Thomas E. Hawk, P.O. Box 354, Salado, Tex. 76571

[21] Appl. No.: 926,336

[22] Filed: Aug. 6, 1992

[51] Int. Cl.$^5$ .............................................. A01K 85/00
[52] U.S. Cl. .................................. 43/42.49; 43/44.86; 43/44.93; 24/607
[58] Field of Search ........................ 24/607, 606, 453; 411/348; 43/42.49, 44.83, 44.86, 42.09, 44.93, 42.12

[56] References Cited

U.S. PATENT DOCUMENTS

| | | |
|---|---|---|
| 1,710,102 | 3/1928 | Moore . |
| 2,243,663 | 4/1940 | Wareham . |
| 2,295,292 | 8/1941 | Rogers . |
| 2,307,200 | 4/1941 | Cullerton . |
| 2,642,689 | 6/1953 | Cline .............................. 24/607 |
| 2,884,732 | 4/1957 | Bailer . |
| 3,009,279 | 4/1958 | Jacobson . |
| 3,357,124 | 4/1965 | Stepacoff et al. . |
| 3,430,305 | 3/1969 | Geffner .......................... 411/348 |
| 3,914,965 | 10/1975 | Paxton ........................... 411/348 |
| 4,228,611 | 10/1980 | McGahee . |
| 4,464,857 | 8/1984 | Olszewski . |

FOREIGN PATENT DOCUMENTS 2357200  2/1978  France ........................... 24/607

OTHER PUBLICATIONS

Halgrin Wholesale Jewelry Catalog, 1992, p. 47; Z Sambi Court, Farmingville, N.Y. 11738.

*Primary Examiner*—Kurt C. Rowan
*Assistant Examiner*—James Miner
*Attorney, Agent, or Firm*—Shaffer & Culbertson

[57] ABSTRACT

A quick release fishing lure connection includes a base member rigidly connected to the lure body and a separate connector member with a connecting portion adapted to be received in a receptacle formed in the base member. The base member includes a retaining feature formed on a side wall of the receptacle and the connector member includes a locking member movably mounted on the connecting portion. The locking member is adapted to reside in either a retracted position or an extended position. When in the extended position, the locking member contacts the retaining feature on the base member to retain the connector member in the base. The retaining feature may comprise an annular groove that allows the connector member and a hook connected thereto to pivot within the base.

20 Claims, 2 Drawing Sheets

QUICK RELEASE FISHING LURE CONNECTION APPARATUS AND METHOD

BACKGROUND OF THE INVENTION

This invention relates to fishing lures and more particularly to a quick release connection for detachably connecting hooks, fishing line, and other articles to a lure.

Fishing lures commonly include one or more hooks that are permanently attached to the lure body. The permanently attached hooks, however, make storing and handling the lures difficult. Also, where the permanently attached hooks are ill suited for a particular application for the lure, the entire lure must be removed from the line and replaced with one having the desired hooks. This requirement that the entire lure be changed when different hooks or other features are desired creates the need for a large number of lures and further exacerbates the storage and handling problem of lures with permanently attached hooks.

In addition to the hooks permanently attached to the fishing lure, fishing lures also include a permanently attached eye by which the lure may be connected to the fishing line. The preferred method for attaching the fishing lure to the fishing line is simply to tie the line to the eye. Tying fishing lures to fishing line, however, takes time and skill and is particularly difficult to perform while riding in a small, unstable, fishing boat. Numerous connectors exist but are often bulky and interfere with the action of the lure.

Lures with detachable hooks are known in the art. U.S. Pat. No. 3,009,279 to Jacobson and U.S. Pat. No. 2,884,732 to Bailer show respectively a J-slot arrangement and a key arrangement for detachably connecting hooks to a fishing lure. U.S. Pat. No. 3,357,124 to Stepacoff, et al., uses another arrangement for detachably connecting a fishing hook to a lure. All of these devices, however, suffer in that the connector member upon which the hook is mounted must be aligned perfectly with the receiving arrangement on the lure in order to make the connection. Also, all of these devices prevent the hook from rotating on its base. Furthermore, the Stepacoff, et al. detachable hook arrangement interferes with the appearance and function of the lure and can allow the hook to release accidentally.

SUMMARY OF THE INVENTION

The object of the invention is to provide a fishing lure connection and fishing lure that overcomes the above-described problems and others associated with fishing lures.

In order to accomplish this object, a fishing lure connection includes a base rigidly secured to the lure and a separate, detachable connector member. The connector member includes attachment means mounted thereon that cooperates with a retaining feature formed on the base to releasably connect the connector member to the base. The attachment means and retaining feature on the base may cooperate to allow the connector member to pivot or swivel within the base or to fix the connector member in a single position with respect to the base, or both alternatively. A hook or other article may be attached by suitable means to the connector member and thus may be secured to the base member and lure body by the connector member.

The attachment means includes a locking member mounted on the connector member body that is capable of retracting into or extending from the connector member body. A control member also mounted on the connector member body is preferably used to retract or extend the locking member, and the hook or other device is connected to the control member. When the preferred control member is biased or pulled outwardly with respect to the connector member body, it extends the locking member to thereby catch on the retaining feature and lock the connector member in the base. Pushing the control member inwardly, on the other hand, allows the locking member to retract out of contact with the retaining feature on the base and allows the connector member and hook attached thereto to be removed from the base and lure.

To allow the connector member and hook connected thereto to pivot within the base member, the retaining feature preferably comprises a groove extending around the entire circumference of the base member side wall. The groove allows the connector member to be secured to the base without having to align the connector member in any particular angular orientation with respect to the base. Additionally or alternatively to the annular or circumferential groove, a separate fixing retaining feature may be formed on the base. This fixing retaining feature cooperates with the locking member when extended to hold the locking member in a particular position and prevent the connector member on which it is mounted from pivoting with respect to the base.

The connection according to the invention provides a strong but quick release device for connecting hooks, fishing line, and other articles such as spinner blades or skirts to a fishing lure. The connection also allows a fishing lure body to be customized with optimal hooks or other articles suited for a particular application. With all hooks being detachable from the lure body, the lure may be handled and stored easily. Also, the detachable connection may allow the hook or other article to pivot with respect to the lure body.

These and other objects, advantages, and features of the invention will be apparent from the following description of the preferred embodiments, considered along with the accompanying drawings.

DESCRIPTION OF THE PREFERRED EMBODIMENTS

Figure 1:
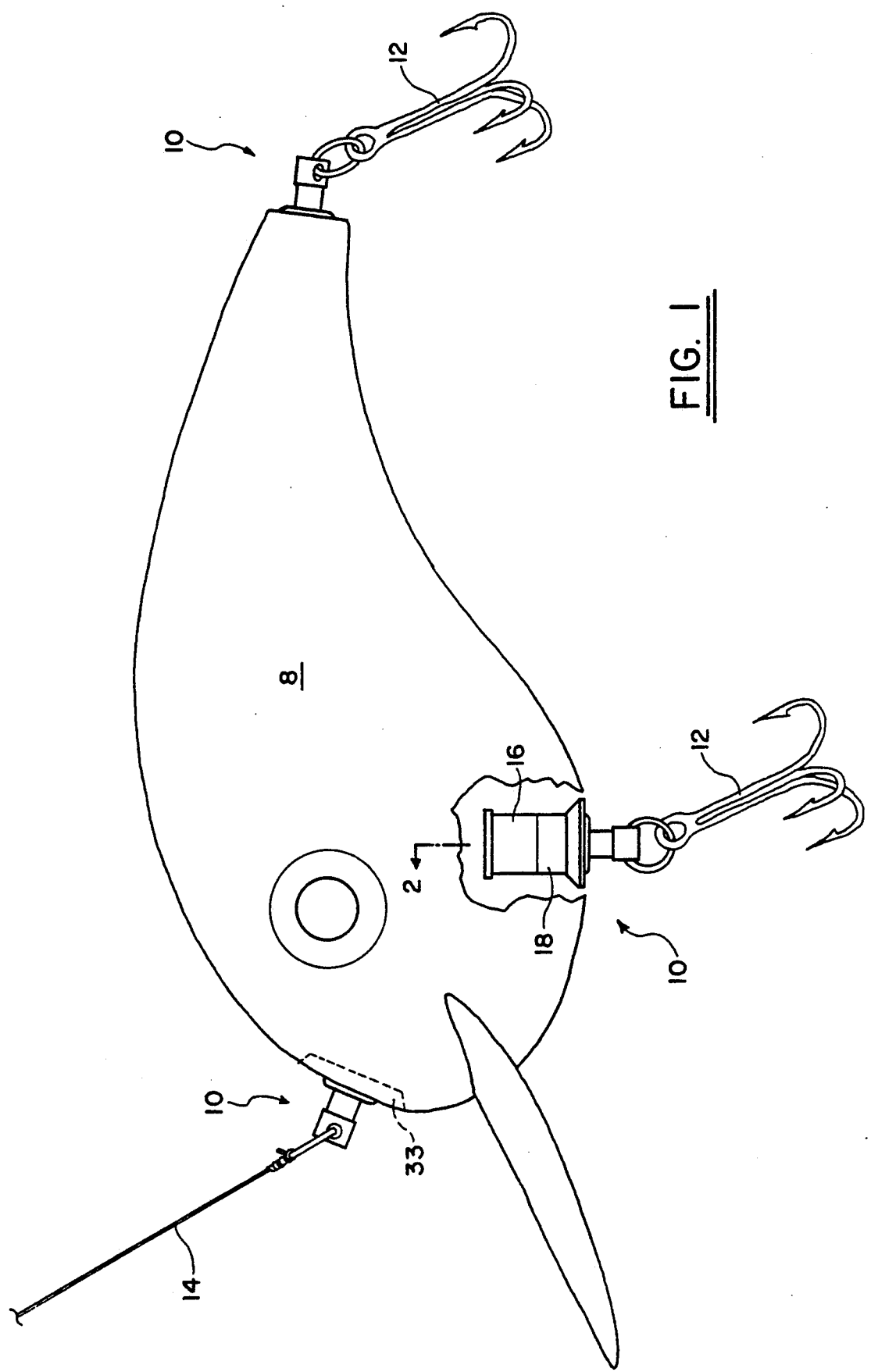
FIG. 1 is a side view of a fishing lure incorporating several fishing lure connections embodying the principles of the invention.

FIG. 1 illustrates a fishing lure 8 incorporating several connections 10 embodying the principles of the invention. The quick release connections 10 according to the invention may be used to connect a number of different articles to the body of the fishing lure. The lure as shown in FIG. 1 includes two treble hooks 12 and fishing line 14 connected to the lure by the connections 10. Those skilled in the art will readily appreciate that other articles such as spinner blades (not shown), or other fishing lure elements, may be connected to the lure 8 by means of the connections 10 according to the principles of the invention. Also, although FIG. 1 shows the connections 10 applied to a molded plastic crank bait, the connections may be used with crank baits having wooden bodies or spinner baits, buzz baits, jigs, slab spoons, in-line spinners, and other types of baits or lures which are made of lead or other metals.

Figure 3:
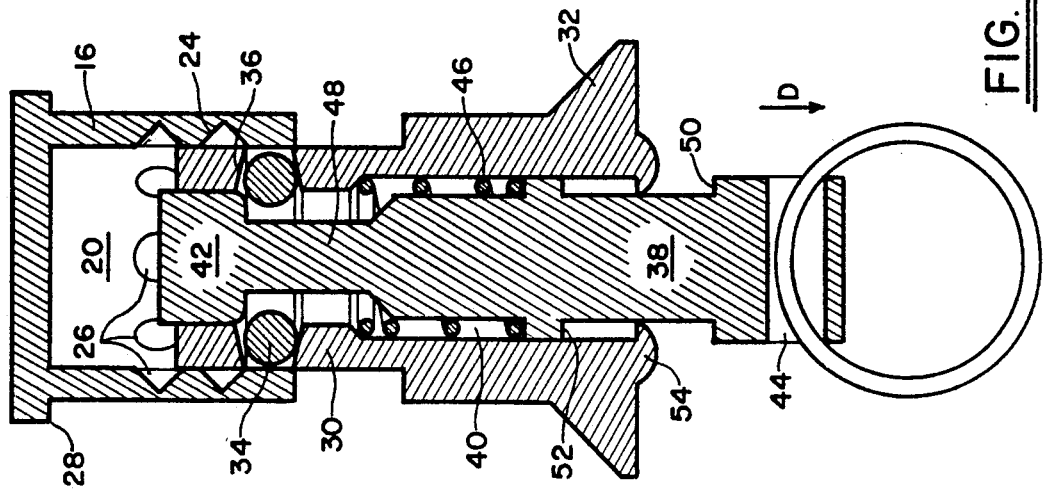
FIG. 3 is a view in longitudinal section similar to FIG. 2 but with the connection partially released.
Figure 2:
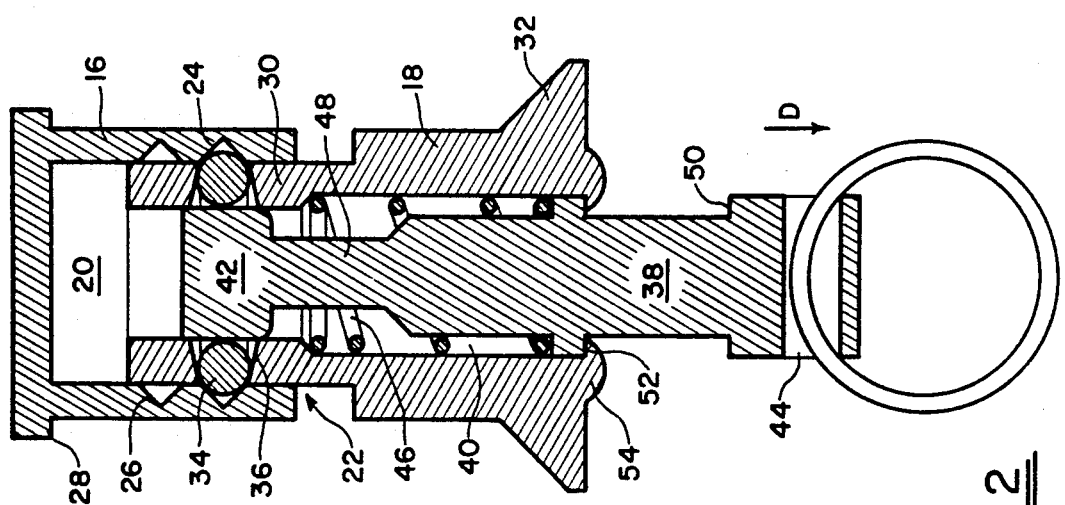
FIG. 2 is a view in longitudinal section taken along 2—2 in FIG. 1.

As shown in FIGS. 1 through 3, the connection 10 comprises a base member 16 and a connector member 18. The base member 16 includes a generally cylindrical receptacle 20 with an outwardly facing receptacle opening 22. An inside wall of the base member includes a retaining feature. The retaining feature may be a pivoting feature 24 or a fixing feature 26. The pivoting retaining feature 24 comprises a groove extending around the entire circumference of the receptacle whereas the fixing retaining feature 26 includes one or more discrete openings. As shown in the illustrated preferred embodiment, the connection 10 may include both the groove and the discrete openings in the same base member 16 although either type of retaining feature may be used exclusively on a particular base member.

Although the base member 16 may be integrally formed with the fishing lure body, it preferably includes a separate member made of a suitable material such as a corrosion resistant metal that is formed into the fishing lure body during the plastic molding process by which the lure body is made. A bottom ridge 28 may be included on the base member 16 to help secure the base member to the lure body in the molding process. In alternative forms of the invention, the separately formed base member may not be rigidly secured to the lure, but connected by a ring or other means that allows the base to move with respect to the lure body. Furthermore, in some forms of the invention the connector member 18 may be secured to the lure body and the element to be connected to the lure, such as a hook, may be secured to the base member 16.

The connector member 18 includes a generally cylindrical body with a connecting portion 30 adapted to be received in the base member receptacle 20. The connector member 18 also preferably includes a removal lip 32 at the end opposite the connecting portion 30. As will be discussed below, the removal lip 32 provides a point for applying a pulling force to remove the connector member 18 from the connected position with the base member 16. As shown in FIG. 1, the lure body 8 preferably includes a recessed portion 33 adjacent each connection 10 to provide access to the removal lip 32.

An attachment means is mounted on the connecting portion 30 of the connector member 18 and includes one or more locking members 34. In the illustrated form of the invention, the locking members 34 comprise balls each mounted in a generally frustoconically shaped opening 36 extending through a side of the connector member 18. In FIG. 2, the locking members 34 reside in an extended position in which a portion of each member extends substantially beyond the outer surface of the connector member 18. In FIG. 3, the locking members reside in a retracting position in which no portion of the locking member extends substantially past the outer surface of the connector member 18. As can be appreciated from FIG. 2, when the locking members 34 are in the extended position with the connecting portion 30 of the connector member 18 received in the base receptacle 20, the members may cooperate with one of the retaining features 24 or 26 formed on the base 16 to prevent the connector member from being removed. When the locking members reside in the retracted position shown in FIG. 3, however, they may move out of contact with the retaining features 24 or 26 and allow the connector member 18 to be separated from the base member 16.

The attachment means also includes a control member 38 mounted in a longitudinal opening 40 extending through the connector member 18 for selectively moving the locking members 34 to the extended position or allowing the locking members to move to the retracted position. The illustrated preferred control member 38 has a generally cylindrical cross section and includes a cam surface 42 on a portion of its length that extends through the connecting portion 30 of the connector member 18. The opposite end of the control member from the end having cam surface 42 preferably includes an opening 44, or alternatively an eye, by which a hook or other article may be connected thereto. The illustrated preferred form of the invention also includes biasing means comprising a spring 46 adapted to bias the control member 38 in the direction from the connecting portion of the connector member to its opposite end, illustrated as direction D in the FIGS. 2 and 3.

In FIG. 2 the control member 38 is shown in a locked position in which the cam surface 42 formed thereon forces the locking members 34 to their extended position thereby locking the connector member 18 in the base 16. In FIG. 3, the control member 38 is pushed inwardly toward the base 16, opposite direction D, to align in a relatively narrow section 48 on the control member with the locking members 34 which allows the locking members to move to their retracted position. At this point, a force applied to the connector member in the direction D separates the connector member 18 from the base member 16.

The connection can again be made by inserting the connecting portion 30 of the connector member 18 until the locking members 34 longitudinally align with the desired retaining feature 24 or 26 on the base member 16. The biasing spring 46 then biases the control member outwardly in the direction D allowing the cam surface 42 formed on the control member 38 to move the locking members to their extended position in which they cooperate with the particular retaining feature 24 or 26. The longitudinal movement of the control member 38 within the connector member 18 is preferably controlled within a particular range by upper and lower stops 50 and 52, respectively, formed on the control member and a rim 54 formed on the connector member.

The operation of the quick release connection 10 and the connecting method according to the invention may now be described with particular reference to FIGS. 2 and 3. With the base member 16 molded into o otherwise formed on the body of the lure 8 the method includes first inserting the connecting portion 30 of the connector member 18 into the base receptacle 20. With the connecting portion 30 inserted into the receptacle to the position shown in FIG. 2, the method includes extending the locking members 34 from the connecting portion. Once in the extended position, contact between the locking members 34 and the retaining feature 24 holds the connector member 18 in the base member 16 and contact between the cam surface 42 of the control member 38 and the locking members 34 holds the locking members in the extended position to maintain the connection.

When the locking members 34 are extended into the circumferential groove forming the pivot retaining feature 24, as shown in FIG. 2, the connector member 18 and control member 38 may rotate or pivot with respect to the base member 16 about their longitudinal axes. This pivot feature may be required for certain types of articles to be connected to the lure. For example, spinner blades require the pivot action and the pivot action may be advantageous for hooks.

Alternatively to the pivot retaining feature 24, the locking members 34 may each be aligned to cooperate with one of the fixing retaining features 26 formed in the base receptacle 20. In this case, the connector member 18 may not pivot with respect to the base member 16 and the control member 38 resists such pivoting. If desired, the control member 38 may be keyed by suitable means within the connector member 18 to positively prevent the control member 38 from pivoting about its longitudinal axis with respect to the base member 16. The fixing retaining feature is particularly useful when the connection 10 is used to connect fishing line to the lure because it controls the position of the opening 44 and this position effects the direction in which the lure runs.

The steps of extending the locking members 34 and holding the locking members in place are performed by the control member 38 in cooperation with the biasing spring 46. With the locking members 34 aligned with the desired retaining feature 24 or 26 on the base member 16, the biasing spring 46 moves the control member 38 in the direction D with respect to both the base member 16 and the connector member 18 and the cam surface 42 formed on the control member 38 moves the locking members 34 to the extended position. The biasing spring 46 also holds the control member 38 in this lock position until the force of the biasing spring is overcome and the control member 38 is moved opposite the direction D with respect to the connector member to the release position shown in FIG. 3.

Once the quick release connection 10 according to the invention is in the connected position as shown in FIG. 2, it may only be released by first moving the control member 38 in the direction opposite the direction D and then pulling or lifting the connector member 18 in the direction D. Simply pulling the control member 38 in direction D does not weaken the connection. Thus, the connection is very strong and unlikely to accidentally release. Furthermore, the axis of the base member 16 and connector member 18 may be set at an angle to any likely force exerted on the lure 8 to even further reduce the possibility of accidental release. Yet the connection 10 may be released easily with one hand using one finger to press downwardly on the control member 38 and another finger to lift upwardly on the removal lip 32 formed on the connector.

The above-described preferred embodiments are intended to illustrate the principles of the invention, but not to limit the scope of the invention. Various other embodiments and modifications to these preferred embodiments may be made by those skilled in the art without departing from the scope of the following claims. For example, although both the connector member 18, locking members 34, control member 38, and base member 16 are preferably made from a suitable corrosion resistant metal, any suitable material may be used. Also, various stop arrangements may be used to control the longitudinal movement of the control member 38 within the connector member 18. Furthermore, any suitable biasing arrangement may be used to bias the control member to the lock position in which it extends the locking members.

I claim:

1. A quick release fishing lure connection comprising:
   (a) a base member secured to a lure body and having a base member receptacle therein with an outwardly facing receptacle opening;
   (b) a retaining feature formed on a side wall of the base member receptacle;
   (c) a connector member having a connecting portion adapted to be received in the base member receptacle through the receptacle opening;
   (d) a locking member movably mounted on the connecting portion and capable of alternatively residing in an extended position and a retracted position, the locking member for contacting the retaining feature when in the extended position while the connecting portion is received in the base member receptacle thereby preventing the connecting portion from being withdrawn, and for allowing the connecting portion to be withdrawn from the base member receptacle when in the retracted position;
   (e) a control member movably mounted on the connector member adapted to move between a lock position in which it holds the locking member in the extended position and a release position in which it allows the locking member to move to the retracted position;
   (f) means for retaining the control member in the lock position; and
   (g) means associated with the connector member fore receiving an article to be connected to the lure body.

2. The fishing lure connection of claim 1 wherein:
   (a) a base member receptacle has a generally cylindrical transverse cross-sectional shape;
   (b) the connecting portion of the connecting member has a generally cylindrical transverse cross-sectional shape; and
   (c) the retaining feature comprises a pivot retaining feature extending around the entire circumference of the base member receptacle side wall so that the connecting portion may pivot freely with respect to the base member abut a longitudinal axis of the base member receptacle, when the connecting portion is received in the base member receptacle with the locking member in the extended position.

3. The fishing lure connection of claim 1 wherein the retaining feature comprises:
   (a) a fixing retaining feature comprised of an opening in the base member receptacle side wall capable of receiving the locking member when it is in the extended position with the connecting portion received in the base member receptacle and preventing the locking member from moving substantially in any direction to thereby prevent the connecting portion from being removed or pivoting with respect to the base member.

4. The fishing lure connection of claim 1 wherein the base member receptacle and the connecting portion of the connector member both have a generally cylindrical transverse cross-sectional shape and including two separate retaining features comprising:
   (a) a pivot retaining feature-extending around the entire circumference of the base member receptacle side wall also that the connecting portion and connector member may pivot freely with respect to the base member about a longitudinal axis of the base member receptacle when the connecting portion is received in the base member receptacle with the locking member in the extended position; and (b) a fixing retaining feature extending into the base member receptacle side wall and capable of receiving the locking member when it is in the extending position with the connecting portion received in the base member receptacle and preventing the locking member from moving substantially in any direction when the locking member is held in the extended position.

5. The fishing lure connection of claim 1 wherein:
(a) the locking member comprises a ball movably mounted within a channel formed in the connecting portion of the connecting member;
(b) the control member comprises an elongated member mounted within an opening extending longitudinally through the connector member with a first end extending into the connecting portion of the connector member rand with an exposed end extending out of the conductor member at an outer end of the connector member opposite the connecting portion, the elongated control member having a cam surface on the first end thereof, the cam surface adapted to force the locking member ball outwardly to the extended position as the control member moves in the direction from the connecting portion of the connector member to the outer end of the connector member;
(c) the means for retaining the control member in the lock position includes a biasing spring acting between the control member and the connector member; and
(d) the means for receiving an article to be connector the lure body comprises an opening extending transversely through the exposed end of the control member.

6. The fishing lure connection of claim 1 wherein:
(a) substantially the entire connector member is contained within the lure body when the connecting portion is received in the base member receptacle and the locking member is in the extended position contact the retaining feature.

7. A fishing lure comprising:
(a) a lure body;
(b) a base member secured to the lure body and having a base member receptacle therein with an outwardly facing receptacle opening;
(c) a retaining feature formed on a side wall of the base member receptacle;
(d) a connector member having a connecting portion adapted to be received in the base member receptacle through the receptacle opening;
(e) a locking member movably mounted on the connecting portion and capable of alternatively residing in an extended position and a retracted position, the locking member for contacting the retaining feature when in the extended position while the connecting portion is received in the base member receptacle thereby preventing the connecting portion from being withdrawn, and for allowing the connecting portion to be withdrawn from the base member receptacle when in the retracted position;
(f) a control member movably mounted on the connector member adapted to move between a lock position in which it holds the locking member in the extended position and a release position in which it allows the locking member to move to the retracted position;
(g) means for retaining the control member in the lock position; and (h) means associated with the connector member for receiving an article to be connected to the lure body.

8. The fishing lure of claim 7 wherein:
(a) the base member receptacle has a generally cylindrical transverse cross-sectional shape;
(b) the connecting portion of the connecting member has a generally cylindrical transverse cross-sectional shape; and
(c) the retaining feature comprises a pivot retaining feature extending around the entire circumference of the base member receptacle side wall so that the connecting portion may pivot freely with respect to he base member about a longitudinal axis of the base member receptacle with the locking member in the extended position.

9. The fishing lure of claim 7 wherein the retaining feature comprises:
(a) a fixing retaining feature comprised of an opening in the base member receptacle side wall capable of receiving the locking member when it is in the extended position with the connecting portion received dint he base member receptacle, an preventing the locking member from moving substantially in any direction to thereby prevent the connecting portion from being removed or pivoting with respect to the base member.

10. The fishing lure of claim 7 wherein the base member receptacle an the connecting portion of the connector member both have a generally cylindrical transverse cross-sectional shape and including two separate retaining features comprising:
(a) a pivot retaining feature extending around the entire circumference of the base member receptacle side wall so that the connecting portion and connector member may pivot freely with respect to the base member about a longitudinal axis of the base member receptacle when the connecting portion is received in the base member receptacle with the locking member in the extended position; and
(b) a fixing retaining feature extending into the base member receptacle side wall and capable of receiving the locking member when it is in the extended position with the connecting portion received in the base member receptacle and preventing the locking member for moving substantially in any direction when the locking member is held in the extended position.

11. A quick release fishing lure connection comprising:
(a) a base member secured to a lure body and having a base member receptacle therein with an outwardly facing receptacle opening;
(b) a pivot retaining feature formed on a side wall of the base member receptacle;
(c) a connector member having a connecting portion adapted to be received in the base member receptacle through the receptacle opening;
(d) article receiving means associated with the connector member for receiving an article to bee connected to the lure body; and
(e) attachment means for cooperating with the pivot retaining feature when the connecting portion si received in the base member receptacle to releasably connect the connector member to the base member while enabling the article receiving means to pivot 360 degrees within the base member receptacle about a longitudinal axis of the base member receptacle.

12. The fishing lure connection of claim 11 further comprising:
(a) a fixing retaining feature formed on a side wall of the base member receptacle; and
(b) the attachment means is also capable of cooperating with the fixing retaining feature when the connecting portion is received in the base member receptacle to releasably connect the connector member to the base member such that the connector member may not move with respect to the base member.

13. The fishing lure connection of claim 11 wherein the connector member is elongated with an opening extending longitudinally therethrough and wherein the attachment means comprises:
(a) at least one locking member movably mounted on the connecting portion of the connector member and capable of residing alternatively in an extending position and a retracted position, the locking member for contacting the pivot retaining feature when int he extended position while the connecting portion is received in the base member receptacle thereby preventing the connecting portion from being withdrawn from the base member receptacle, and for allowing the connecting portion to be withdrawn from the base member receptacle when in the retracted position;
(b) an elongated control member mounted in the connector member opening with an exposed end extending out of a first end of the connector member opposite the connecting portion hereof and having a cam surface adapted to force each locking member of the extended position as the control member moves within the connector member in the direction from the connecting portion to the first end thereof; and
(c) biasing means adapted to act between the connector member and the control member for biasing the control member in a direction form the connecting portion of the connector member to the first ned thereof.

14. A method for connecting an article to a fishing lure comprising the steps of;
(a) inserting a connecting portion of a connector member into a receptacle within body of the fishing lure to join the article to the fishing lure;
(b) with the connecting portion inserted into the receptacle, extending a locking member to an extended position out of the connecting portion to contact a retaining feature formed on a side wall of the receptacle so that the contract between the retaining feature and the locking member retains the connecting portion in the receptacle; and
(c) holding the locking member in the extended position with a control member mounted on the connector member.

15. The method of claim 14 wherein the receptacle is cylindrical in shape and the retaining feature extends around the entire circumference of a receptacle side wall so that the connector may rotate about a longitudinal axis of the receptacle while retaining in the receptacle by the contact between the locking member and the retaining feature.

16. The method of claim 14 wherein the control member is movably mounted within an opening extending through the connector member and includes a cam end with a cam surface associated therewith and an opposite exposed end extending out of a first end of the connector member opposite the connecting portion, and including the step of:
(a) biasing the control member in the direction from the connecting portion of the connector member to the first end thereof.

17. The method of claim 14 wherein the step of extending the locking member to contact the retaining feature comprises the step of:
(a) contacting the locking member with a cam surface formed on a cam end of the control member as the control member moves in the direction from the connecting portion of the connector member to the first end thereof.

18. The method of claim 14 wherein the receptacle is secured to the lure and the article to be connected to the lure is secured to the locking member.

19. The method of claim 14 wherein the connector member is secured to the lure and the article to be connected to the lure is secured to a base member in which the receptacle is formed.

20. The method of claim 14 wherein the step of inserting the connecting portion of the connector member into the receptacle within the body of the fishing lure includes:
(a) inserting the connecting portion of the connector member into the receptacle to a point at which substantially the entire connector member is contained within the lure body.

* * * * *

UNITED STATES PATENT AND TRADEMARK OFFICE
CERTIFICATE OF CORRECTION

PATENT NO. : 5,299,379
DATED : April 5, 1994
INVENTOR(S) : Thomas E. Hawk It is certified that error appears in the above-identified patent and that said Letters Patent is hereby corrected as shown below:

In Claim 2, column 6, line 41, of the Patent change "abut" to --about--.

In Claim 4, column 7, line 3, of the Patent, change "extending" to --extended--.

Signed and Sealed this

Thirtieth Day of August, 1994

*Attest:*

BRUCE LEHMAN

*Attesting Officer*        *Commissioner of Patents and Trademarks*